United States Patent
Chakra et al.

(10) Patent No.: US 11,496,291 B2
(45) Date of Patent: *Nov. 8, 2022

(54) VALIDATING RECEIVED SENSOR DATA USING COMPUTER CRYPTOGRAPHIC PROCESSING

(71) Applicant: International Business Machines Corporation, Armonk, NY (US)

(72) Inventors: Al Chakra, Apex, NC (US); Bryce Frey, Tilden, NE (US); Komal Shrivastava, Milton, GA (US); Jonathan Erskine, Coral Springs, FL (US); Matthew Fletcher, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 193 days.

This patent is subject to a terminal disclaimer.

(21) Appl. No.: 16/942,784

(22) Filed: Jul. 30, 2020

(65) Prior Publication Data
US 2022/0038260 A1 Feb. 3, 2022

(51) Int. Cl.
*H04L 29/06* (2006.01)
*H04L 9/06* (2006.01)
(Continued)

(52) U.S. Cl.
CPC ........ *H04L 9/0643* (2013.01); *G06F 16/1837* (2019.01); *H04L 9/0637* (2013.01); *H04L 9/3271* (2013.01); *H04L 9/50* (2022.05)

(58) Field of Classification Search
None
See application file for complete search history.

(56) References Cited

U.S. PATENT DOCUMENTS

| 6,199,049 B1 | 3/2001 | Conde |
| 7,043,473 B1 | 5/2006 | Rassool |

(Continued)

FOREIGN PATENT DOCUMENTS

| AU | 2386597 A | 11/1997 |
| DE | 10358144 A1 | 8/2005 |

(Continued)

OTHER PUBLICATIONS

Chakra, et al., "Validating Primary Subsets of Received Sensor Data Using Computer Cryptographic Processing", U.S. Appl. No. 17/303,721, filed Jun. 6, 2021.

(Continued)

*Primary Examiner* — Andrew J Steinle
(74) *Attorney, Agent, or Firm* — Michael A. Petrocelli

(57) ABSTRACT

Media capture and verification originally-captured media files, the nature of modifications made to captured media files, and the authenticity of various versions of files related to the captured media are discussed. A computer identifies capture device output that represents an aspect of a recorded event. The computer cryptographically processes the capture device output to produce a validatable master file which includes master media data from the capture device output, master metadata of said master media data, and master file blockchain data. The master file blockchain data includes a master file block history portion, a master file signature key portion, a master file change indication portion, and a master file signed data hash portion. The computer also modifies the master media data to produce reference file media data. reference files and distributable files. The computer verifies the authenticity of each of these files.

20 Claims, 11 Drawing Sheets

(51) Int. Cl.
*G06F 16/182* (2019.01)
*H04L 9/32* (2006.01)
*H04L 9/00* (2022.01)

(56) References Cited

U.S. PATENT DOCUMENTS

| | | | |
|---|---|---|---|
| 7,262,764 | B2 | 8/2007 | Wang |
| 9,087,325 | B2 | 7/2015 | Chijiiwa |
| 9,679,276 | B1 | 6/2017 | Cuende |
| 9,952,934 | B2 | 4/2018 | Sinha |
| 10,348,505 | B1 | 7/2019 | Crawforth |
| 10,355,865 | B1 | 7/2019 | Crawforth |
| 10,361,866 | B1 | 7/2019 | McGregor |
| 10,560,261 | B1 | 2/2020 | Crawforth |
| 2004/0027604 | A1 | 2/2004 | Jeran |
| 2004/0153649 | A1 | 8/2004 | Rhoads |
| 2007/0088957 | A1 | 4/2007 | Carson |
| 2017/0046652 | A1 | 2/2017 | Haldenby |
| 2017/0206523 | A1 | 7/2017 | Goeringer |
| 2017/0373859 | A1 | 12/2017 | Shors |
| 2018/0308094 | A1* | 10/2018 | Jayaram ............ G06Q 20/3827 |
| 2019/0182042 | A1* | 6/2019 | Ebrahimi ............ H04L 63/083 |
| 2019/0361869 | A1 | 11/2019 | Krabbenhöft |
| 2020/0136799 | A1* | 4/2020 | Smith ............... H04L 63/00 |
| 2020/0405148 | A1* | 12/2020 | Tran .................. A61B 3/0016 |

FOREIGN PATENT DOCUMENTS

| | | | |
|---|---|---|---|
| DE | 102007041694 | A1 | 3/2009 |
| WO | 2018032377 | A1 | 2/2018 |
| WO | 2019236470 | A1 | 12/2019 |

OTHER PUBLICATIONS

Gilbert, Peter, "Assuring Data Authenticity While Preserving User Choice in Mobile Sensing", Dissertation for Doctor of Philosophy, Duke University, 2018, 106 pages.

List of IBM Patents or Patent Applications Treated as Related. Filed Herewith. 2 pages.

Offenhuber, Dietmar, "Transformative copy", Masters Thesis, Massachusetts Institute of Technology, Feb. 2008, 76 pages.

"How much space per hour does uncompressed 4K, 60fps video take?", posted by u/Bond4141, last printed Apr. 9, 2020, 1 page, <https://www.reddit.com/r/theydidthemath/comments/2wsb0v/request_how_much_space_per_hour_does_uncompressed/cotnoia/?utm_source=share&utm_medium=web2x>.

"Method & System for Prevention of Anti Tampering of Media Content", An IP.com Prior Art Database Technical Disclosure, Disclosed Anonymously, IP.com No. IPCOM000259235D, IP.com Electronic Publication Date: Jul. 22, 2019, 4 pages.

"Signed XML Dynamic Metadata Injection Method", An IP.com Prior Art Database Technical Disclosure, Disclosed Anonymously, IP.com No. IPCOM000248526D, IP.com Electronic Publication Date: Dec. 14, 2016, 7 pages.

"Verifying Authenticity of Digital Images Using Digital Signatures", An IP.com Prior Art Database Technical Disclosure, Disclosed Anonymously, IP.com No. IPCOM000256882D, IP.com Electronic Publication Date: Jan. 7, 2019, 12 pages.

Calastry Ramesh, "Storing IOT Data Securely in a Private Ethereum Blockchain", Master of Science Thesis, University of Nevada, Las Vegas, May 2019, 101 pages, <https://digitalscholarship.unlv.edu/thesesdissertations/3582>.

Chakra, et al., "Validating Tracked Portions of Received Sensor Data Using Computer Cryptographic Processing", U.S. Appl. No. 16/942,785, filed Jul. 30, 2020.

Dorri, et al., "LSB: A Lightweight Scalable BlockChain for IoT Security and Privacy", arXiv:1712.02969v1 [cs.CR], Dec. 8, 2017, 17 pages.

England, et. al., "AMP: Authentication of Media via Provenance", arXiv:2001 07886v2 [cs.MM] Jan. 30, 2020, pp. 1-10.

Harran, et al., "A method for verifying integrity & authenticating digital media", Applied Computing and Informatics, 14 (2018), pp. 145-158.

Huckle, et. al., "Fake News: A Technological Approach to Proving the Origins of Content, Using Blockchains", Big Data, vol. 5 No. 4, 2017, DOI: 10.1089/big.2017.0071, pp. 356-371.

Johansson, Bjorn, "Assessing blockchain technology for Transport Data Logger", Master's Thesis, Department of Electrical and Information Technology, Lund University SE-221 00 Lund, Sweden, 99 pages.

Mell et al., "The NIST Definition of Cloud Computing", National Institute of Standards and Technology, Special Publication 800-145, Sep. 2011, 7 pages.

Nota, Bruno, "Israeli Law Bans Skinny, BMI-Challenged Models", ABC News, Jan. 2, 2013, 3 pages, <https://abcnews.go.com/International/israeli-law-bans-skinny-bmi-challenged-models/story?id=18116291>.

Peker, et al., "A Cost Analysis of Internet of Things Sensor Data Storage on Blockchain via Smart Contracts", Electronics 2020, 9, 244, 14 pages.

International Search Report and Written Opinion, International Application No. PCT/CN2021/100105, dated Sep. 16, 2021, 8 pages.

\* cited by examiner

VALIDATING RECEIVED SENSOR DATA USING COMPUTER CRYPTOGRAPHIC PROCESSING

BACKGROUND

The present invention relates generally to the field of media capture, and more specifically, to verifying authenticity of originally-captured media files, the nature of modifications made to captured media files, and the authenticity of various versions of files related to the captured media.

Data may be obtained from sensors in a variety of capture devices, such as a photographic cameras, audio capture devices, infrared video capture devices, radar spatial information capture devices, sonar spatial information capture devices, lidar spatial information capture devices, laser "trip-wires," chemical signature information capture devices, X-ray image capture devices, microwave image capture devices, barometric pressure reading capture devices, anemometer, etc. In some cases, is important to be able to verify that stored data captured by one or more of these devices authentically represents what was captured by the device.

SUMMARY

The present disclosure recognizes the shortcomings and problems associated with confirming the authenticity of as-recorded media files, the nature of changes made to as-recorded media files, and the veracity of files supposedly based on the verifiable changes made to as-recorded media files.

In embodiments according to the present invention, a computer identifies a capture device output that represents an aspect of a recorded event. The computer cryptographically processes the capture device output to produce a validatable master file which includes master media data from the capture device output, master metadata of said master media data, and master file blockchain data. The master file blockchain data includes a master file block history portion, a master file signature key portion, a master file change indication portion, and a master file signed data hash portion. The cryptographically processing includes the computer dividing the media data into at least one data subset, the computer generating a hash of said the data subset, the computer generating metadata of the hash and data subset, the computer combining the hash metadata of the hash into a data packet, and the computer cryptographically signing the data packet. In other aspects of the invention, the computer also modifies master media data to produce reference file media data by preparing a reference file which includes reference file media data, reference file metadata, and reference file blockchain data. The reference file blockchain data includes the master file blockchain data and blockchain incrementing information, which includes a hash of the master file blockchain data, reference file blockchain metadata, and a reference file signed data hash portion. In other aspects of the invention, the reference file further includes instructions indicating replicable changes made by the computer to change the master file media data to the modified media of the reference file. In other aspects of the invention, the computer receives a challenged master file identified as a copy of said validatable master file. The computer also receives a request to validate said challenged master file and executes a master file validation routine to assess validity of said challenged master file. In the master file validation routine, the computer hashes media data of the challenged master file to generate hashed challenged master file media data. The computer unsigns a signed media data hash portion of the challenged master file to generate unsigned challenged master file media data and determines whether said hashed challenged master file media data and said unsigned challenged master file media data match. In other aspects of the invention, the computer receives a reference file identified as a modified version of said master file. The computer also receives a request to determine whether said reference file is a modified version of said master file and executes a reference file verification routine. In the reference file verification routine, the computer determines whether a hash of the master file blockchain data and a hash of reference file blockchain data match. If they match, the computer applies changes indicated by blockchain incrementing information to the reference file media data to generate hashed reference file media data. The computer also unsigns reference file blockchain data to generate unsigned reference file blockchain media data. The computer determines whether the hashed reference file media data and said unsigned reference file blockchain media data match. In other aspects of the invention, the computer receives a reference file identified as an authentic modification of said master file, a distributable file, a request to determine whether said distributable file is an authentic modification of said reference file identified as an authentic modification of said master. The computer then executes a distributable file verification routine, in which the computer determines whether a hash of distributable file blockchain data matches a hash of reference file blockchain data. In the distributable file verification routine, the computer also determines whether a hash of distributable file media data matches a corresponding unsigned hash of a representative media block.

In another embodiment of the invention, a system comprises: a computer system comprising a computer readable storage medium having program instructions embodied therewith, the program instructions executable by a computer to cause the computer to identify a capture device output, said output representing an aspect of a recorded event; cryptographically process said capture device output to produce a validatable master file; wherein said validatable master file includes master media data from said capture device output, master metadata of said master media data, and master file blockchain data; wherein said master file blockchain data includes a master file block history portion, a master file signature key portion, a master file change indication portion, and a master file signed data hash portion.

In another embodiment of the invention, a computer program product comprises computer readable storage medium having program instructions embodied therewith, the program instructions executable by a computer to cause the computer to: identify a capture device output, said output representing an aspect of a recorded event; cryptographically process said capture device output to produce a validatable master file; wherein said validatable master file includes master media data from said capture device output, master metadata of said master media data, and master file blockchain data; wherein said master file blockchain data includes a master file block history portion, a master file signature key portion, a master file change indication portion, and a master file signed data hash portion.

Some issues with confirming authenticity of data files include difficulty in determining whether a given file in fact contains a true copy of the as-recorded data from a capture device. Other problems can include determining whether instructions in a change log are true representations of changes that have occurred to a file containing modified a version of captured data. Other problems occur when trying to validate the authenticity of various versions of files (e.g., reference files and distribution files) which are not duplicates of a master file but which, instead, supposedly contain verifiable variations of the master file.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth below.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
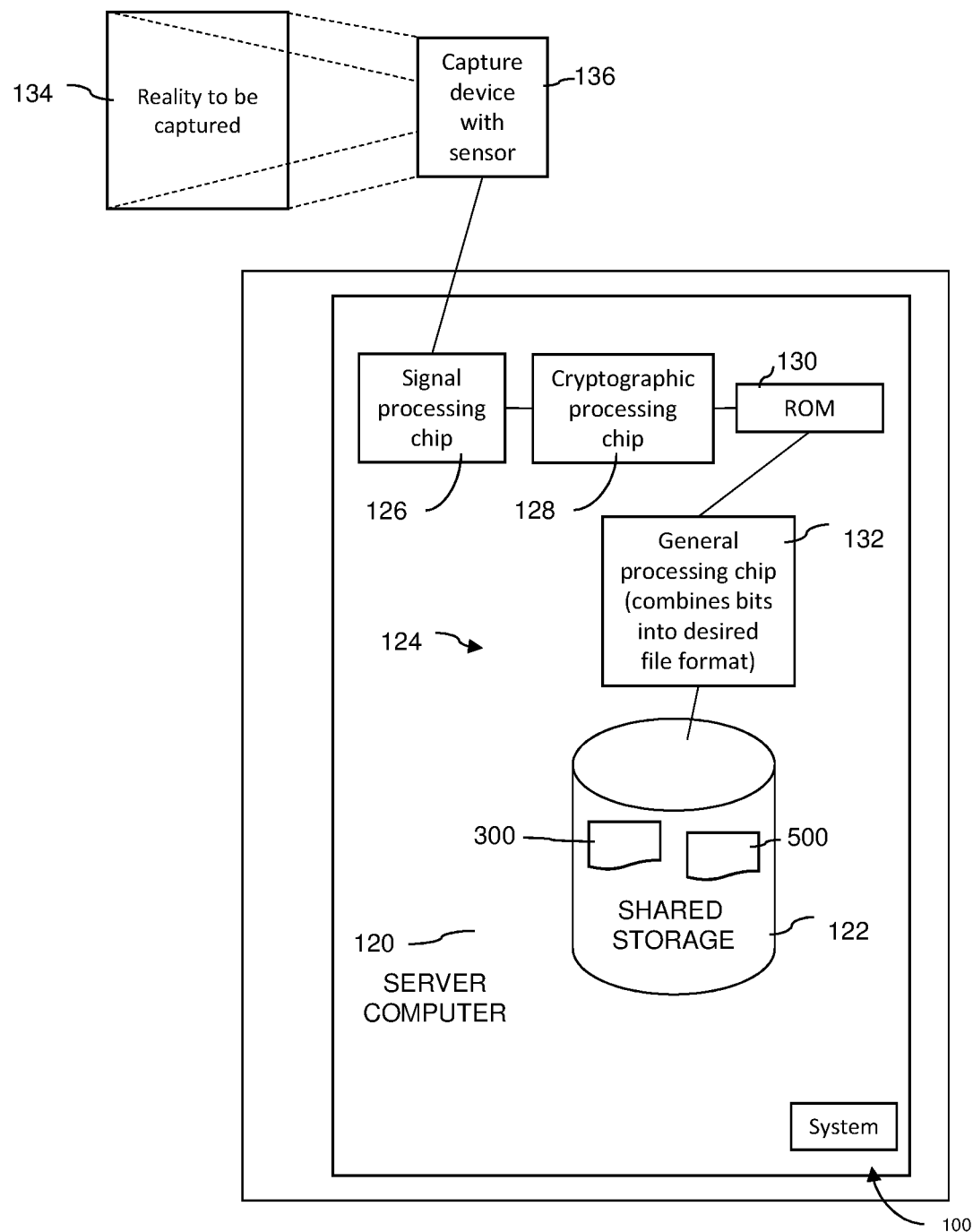
FIG. 1 is a schematic block diagram illustrating an overview of a system for computer-implemented generation of a validatable master media data file.
Figure 2:
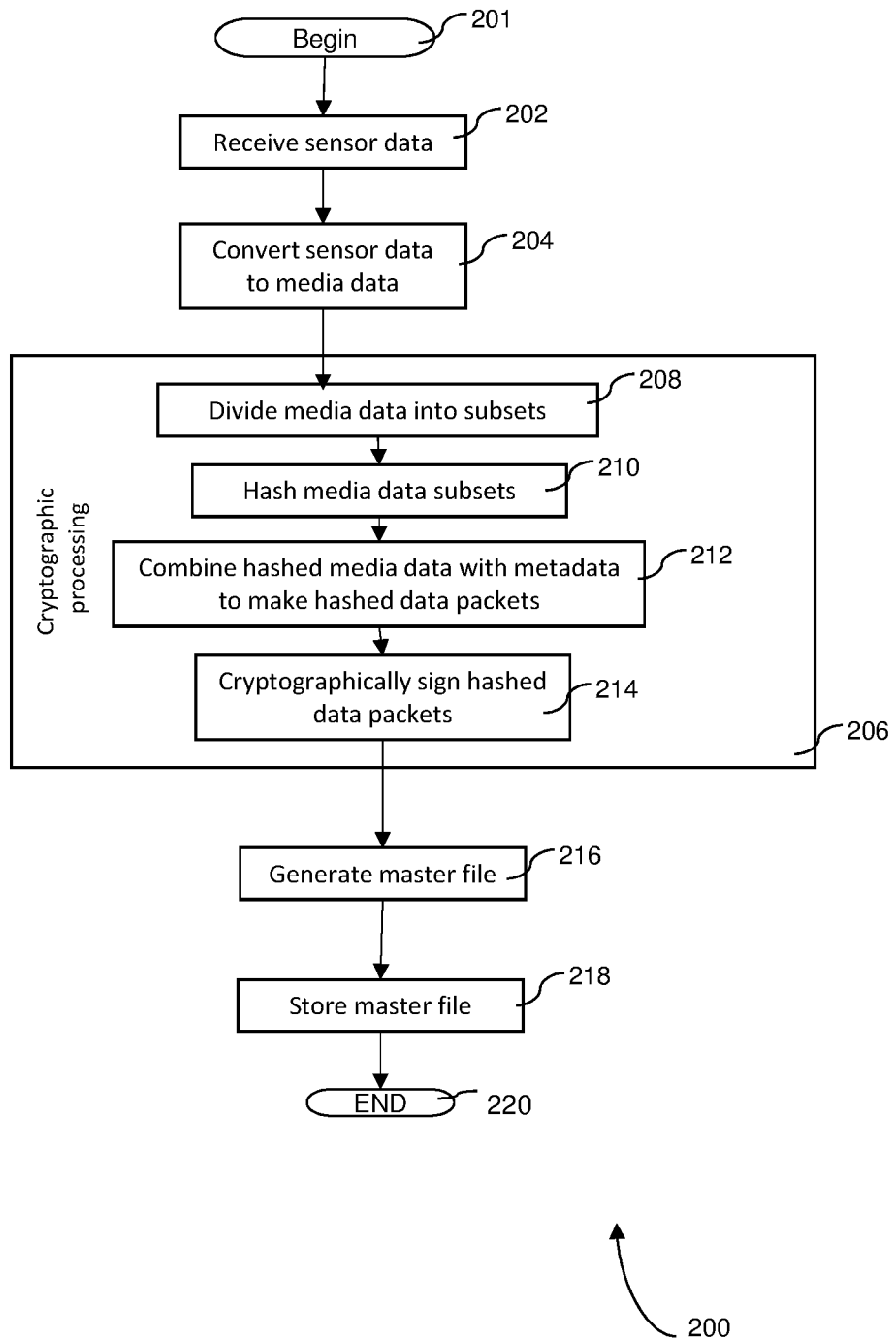
FIG. 2 is a flowchart illustrating a method, implemented using the system shown in FIG. 1, of capturing media data and storing an associated master file.

Now with combined reference to the Figures generally and with particular reference to FIG. 1 and FIG. 2, an overview of method 200 for confirming the authenticity of as-recorded media files, the nature of changes made to as-recorded media files, and the veracity of files supposedly based on the verifiable changes made to as-recorded media files. Method 200 is usable within a system 100 as carried out by a server computer 120 having optionally shared storage 122 and aspects 124 (including a signal processing chip 126, a cryptographic processing chip 128, ROM 130, and a general processing chip 132 that cooperatively confirm the authenticity of as-recorded media files, indicate the nature of changes made to as-recorded media files, and demonstrate the veracity of files supposedly based on the verifiable changes made to as-recorded media files. It is noted that the storage 122 could, within the spirit of aspects of this invention, take a variety of forms, including a receiving bus, an I/O bus, a networking card, or other items capable of receiving file data such as a master file 300, or a reference file 500.

It is noted that the method of the current invention is expected to be used by participant groups (e.g., professional organizations, corporate entities, etc.) and individuals that have appropriate rights to capture the data described herein, as well as the right to use and process the captured data in the ways described. It is also envisioned that any models whose likeness is captured or used in accordance with aspects of the present invention have provided valid consent for such capture and use. The data described herein is captured and used in accordance with legally-appropriate methods and with all consent necessary for the intended uses.

According to aspects of the invention, a capture device with a sensor 136 records an aspect of reality 134, such as an image, a sound, a pressure reading, etc. and passes the aspect along to a signal processing chip 126 associated with a server computer 120. The capture device sensor sends raw data to the signal processing chip 126, where system 100 converts the raw data into a format usable by the system 100 and optionally compressed. If the signal processing chip 126 does not compress the data, an optional compression chip (not shown) may be used. The cryptographic processing chip 128 takes the processed (and possibly compressed) data, divides the data into predetermined subsets (such as pixels or other discrete units associated with the data being processed), and hashes the subsets. Using the hashes of the subsets, the cryptographic processing chip 128 adds metadata for each hash (e.g., the subset, timestamp, etc.) and cryptographically signs the hash data packets (i.e., hashes with respective metadata) with an immutable, unique private key held in the ROM 130. The signed data hashes and media data are passed to the general processing chip 132, which combines the signed data hashes and media data, along with any relevant metadata, into a master file 300 having the format shown in FIG. 3. According to aspects of the invention, the master file blockchain data 310 includes a master file block history portion 311A, a master file signature key portion 314A, and a master file signed data hash portion 316A. It is noted that certain portions of the master file block history may be null or include other agreed content reflecting the original, non-changed nature of the master file 300.

With additional reference to FIG. 2, the server computer 120, at block 202 receives sensor data from capture device 136; the sensor data is converted into media data which is cryptographically processed in block 206. With continued reference to FIG. 2, the cryptographic processing includes dividing media data, at block 208, into subsets and hashing the subsets at block 210. At block 212, the general processing chip 132 combines the hashed media data with metadata (which may, itself, be hashed) into hashed data packets. At block 214, the cryptographic processing chip 128 cryptographically signs the hashed data packets. The general processing chip 132 generates a master file 300 at block 216, and the server computer 120 stores the master file in shared storage 122 at block 218.

Figure 3:
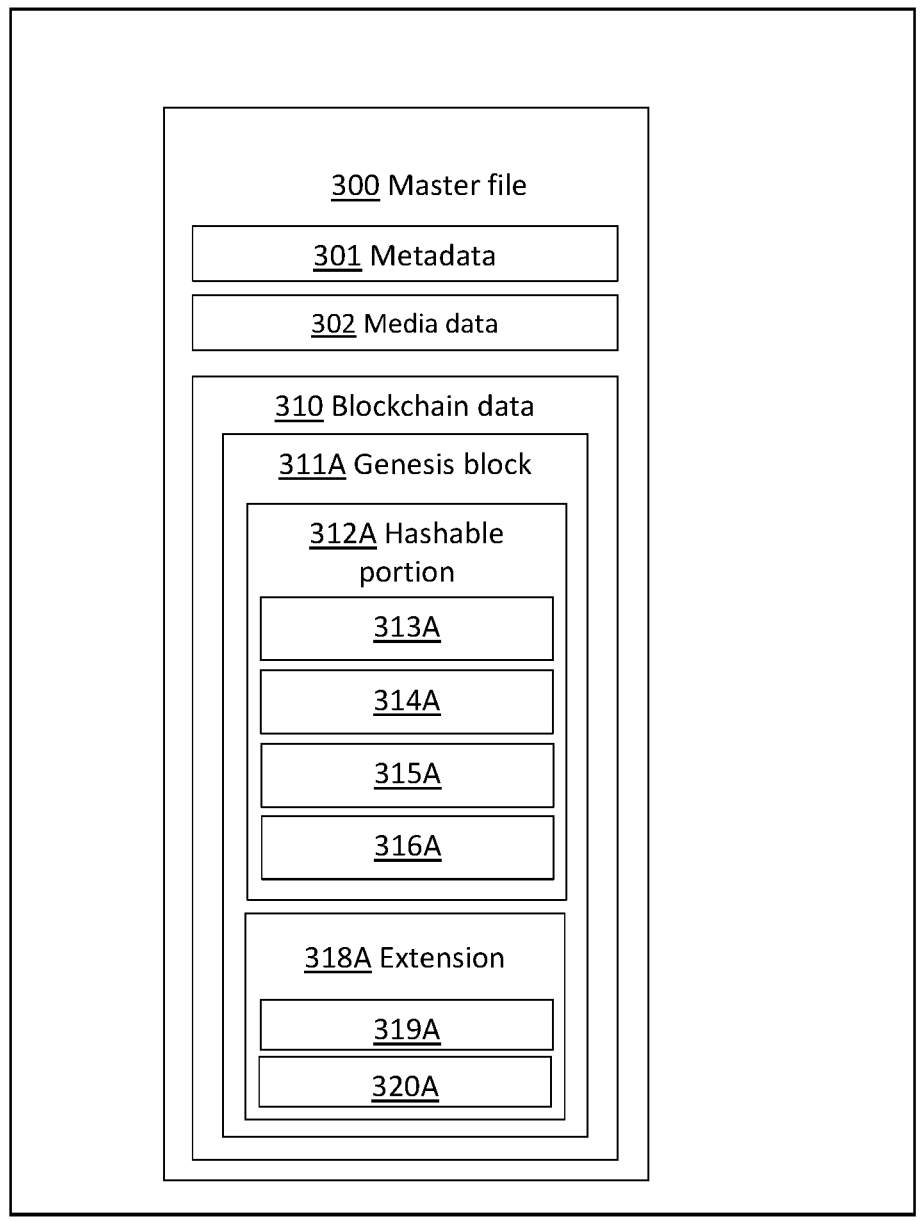
FIG. 3 is an exemplary format of a master file according to aspects of the invention.
Figure 5:
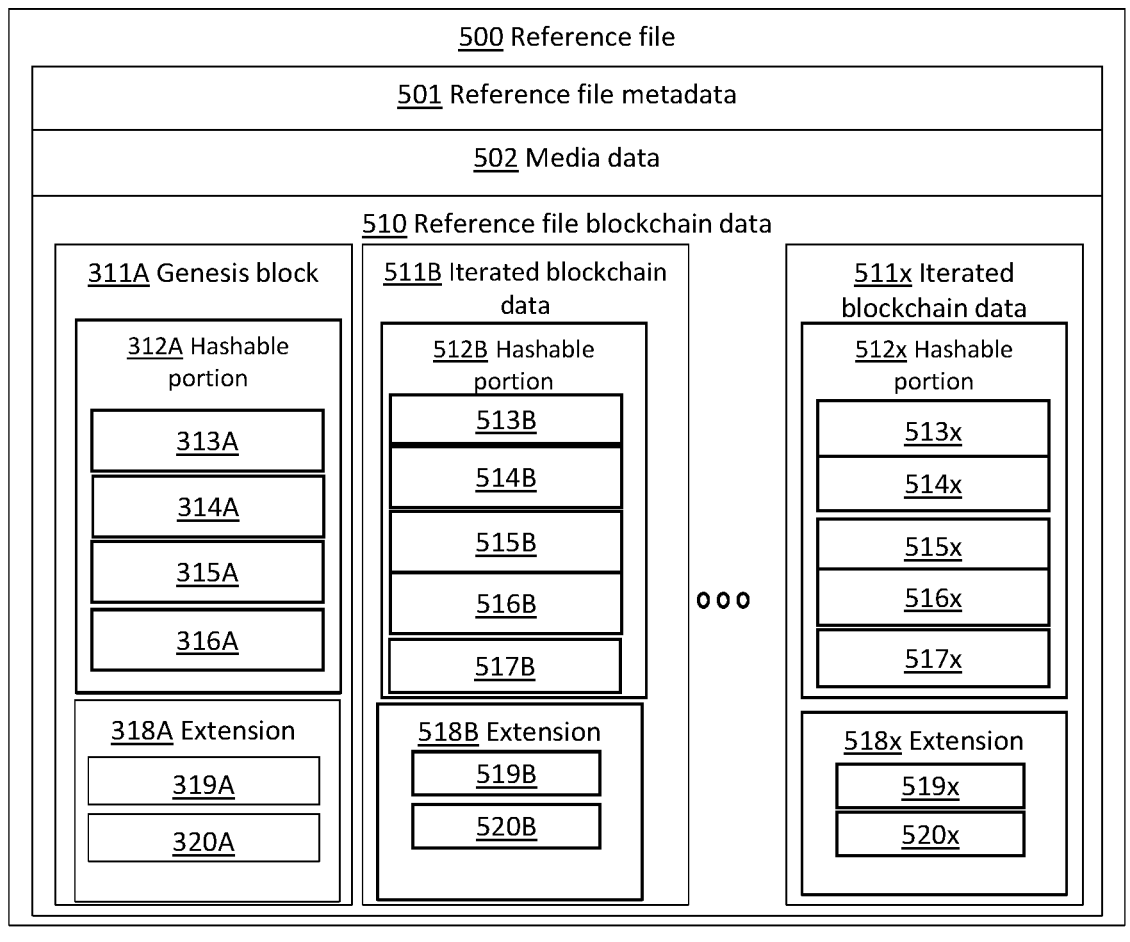
FIG. 5 is an exemplary format of a reference file according to aspects of the invention.

With reference to FIG. 3, the format of a master file 300 according to aspects of this invention is shown; the format, according to embodiments of this invention, includes three portions: metadata 301, sensor media data 302, and internal blockchain data 310. In particular, the master file 300 shown in FIG. 3 is a file with only one block of blockchain data 311A, and this single block is known as a genesis block. The file format may be implemented as an extension to existing file formats. It is noted that while FIG. 3 shows master file 300, the system 100 generates other files (known as reference files 500, which are shown schematically in FIG. 1 and in more detail in FIG. 5) when modifying a master file 300 according to aspects of this invention, and reference files have the same overall format (as shown in FIG. 5, discussed in more detail below).

The internal blockchain data 310 includes blocks of information about the file and versions of its media data (and optionally, metadata) held in blocks that are cryptographically linked by including the cryptographic hash of the previous block, which corresponds to a previous version of the data (and optionally, metadata) of the master file 300 and a reference file 500.

It is noted that the media data 302 of the master file 300 represents original media data captured by a sensor in capture device 136, and the blockchain 310, according to aspects of this invention, is a non-distributed blockchain (i.e., a data structure where each data block contains the cryptographic hash of the previous block) that is internal to a master file 300 and a reference file 500.

The blockchain data 310 contains a hashable portion and optionally (depending on the file variant) certain extensions that are not included in the block hash. The hashable portion includes the previous block hash 313A, 513B, etc. (or, for the genesis block, some agreed upon choice, such as null), the public key used in signatures for this block (optionally, any metadata about the public key), a hash (or root hash) of the changes made from the previous data version to get to this version (or, in the case of the genesis block, some agreed upon choice, such as null), and a signed hash of the current media data 302 in one of two formats. The first signed hash format includes a signed hash of the file metadata for this version (or its hash) and the file media data for this version (or its hash/root hash); the second signed hash format includes a signed hash of the file media data for this version, and (optionally) a signed hash of the file metadata for this version. It is noted that the master file 300 (a file with an internal blockchain that only has one block) has blockchain data divided into subsections as follows: general file metadata 301, media data (original from sensor) 302, internal blockchain (with only one block) 310, the origin/genesis block 311A, hashable portion of the block 312A, previous block hash (in this case, null or some other predefined convention) 313A, public key used in digital signatures optionally including metadata about the public key 314A, other block metadata 315A, either (a) signed hash of the file metadata (or its hash) and the file media data (or its hash/root hash); or (b) signed hash of the file metadata and a signed hash of file (or root hash) of the file media data 316A.

In addition to the structure described above, there are two optional file extension portions that may be included within aspects of this invention. The first extension is a change log (not shown) of some format that enables replicating the changes on the previous version of the media data to get to the current version of the media data. The change log is only required for reference media file copies. The change log is optional, but not necessary for distributable copies. The second extension (not shown) is a copy of the media data at that stage of the history of the media file. It is not required for any of the file variants, and simply may be value added.

Figure 4:
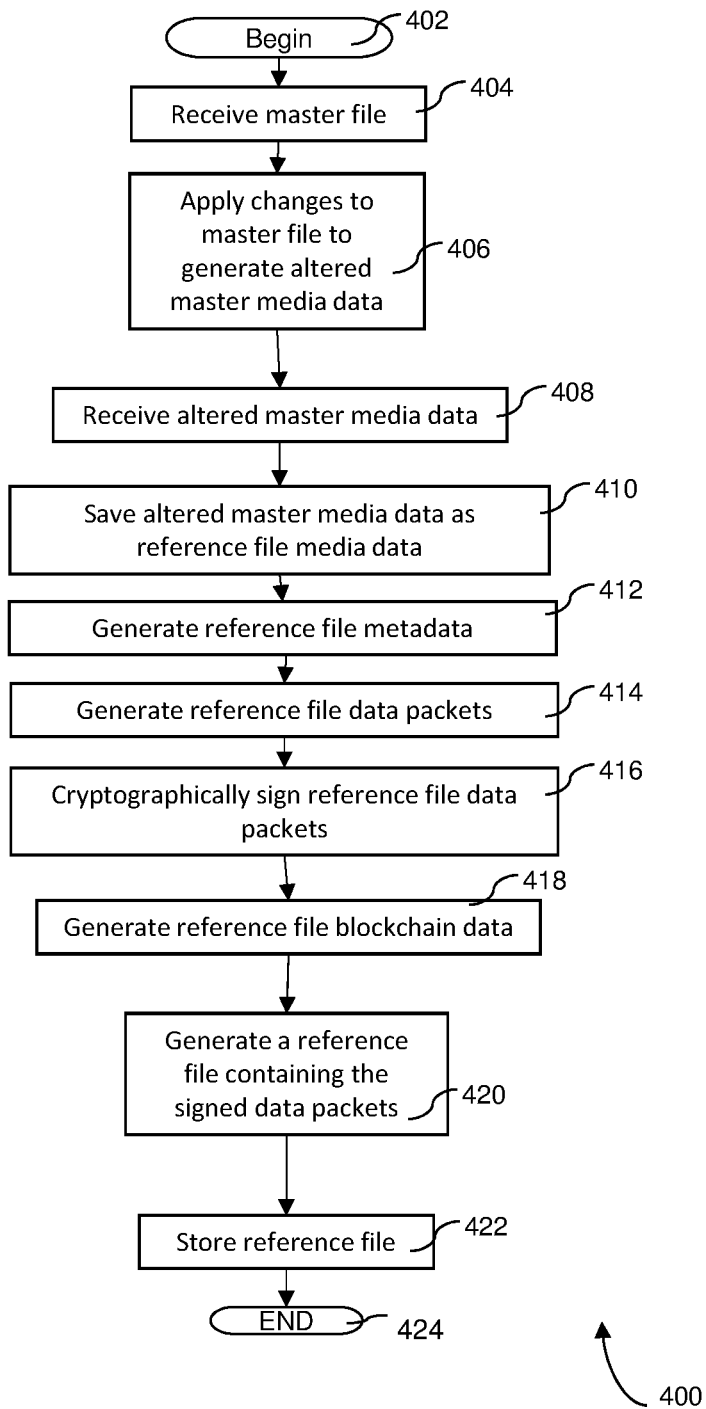
FIG. 4 is a flowchart illustrating a method, implemented using the system shown in FIG. 1, of validating a master file according to aspects of the invention.

With reference to FIG. 4, a method 400 to create a modified version 500 (also known as a reference file) of the master file 300 is shown. As noted above, a reference file 500 according to aspects of this invention is a modified version of the original, master file 300 generated according to the flow logic shown in FIG. 4. At block 404, the server computer 120 receives a copy of the master file 300, and at block 406, the server computer 120 modifies the master file media data 302 using, for example, an image or sound editing algorithm (not shown). After modifying the master media data 302, the server computer 120 receives, at block 408, a file containing the altered master media data 502 (as seen in FIG. 5 and described in detail below). The server computer 120 saves the altered media data, at block 410, as reference file media data 502. The server computer 120, at block 412, generates reference file metadata 501; at block 414, the server computer 120 combines reference file media data 502, reference file metadata 501, and reference file blockchain data 510 into a reference file data packet. As used herein, the term blockchain refers to a traditional blockchain, a hashchain, cryptographically linked list, or other immutable data structure that replicates the functionality and data integrity that a blockchain provides. At block 416, server computer 120 cryptographically signs the reference file data packets. At block 418, the server computer 120 generates reference file blockchain data 510 and updates the blockchain by adding the reference blockchain data 510 to the existing blockchain. At block 420, the server computer 120 generates a reference file 500 containing the signed data packets 516 and saves the reference file blockchain data 510, which is saved at block 422.

As shown with reference to FIG. 5, the reference file blockchain data 510 contains the previous block hash 513B, a public key 514B, and other block metadata 515B, with any relevant metadata, and either option version of the signed, hashed media data described above.

The public key 514B represents the algorithm making the modifications, as either the public key corresponding to a generic private key shared by all applications of the same version or a public key corresponding to a private key that is unique to that application installation. Preferably, (but optionally) the computer may attach replicable instructions 519B for getting from the previous version of the image to this version as part of the block metadata 510B with the signed hash 517B of the instructions 519B.

Additional detail about a preferred structure for the reference file according to aspects of the invention is now provided with particular reference to FIG. 5. A reference file with an internal blockchain that has multiple blocks is shown at 500; this file represents media that has been modified since its original creation. The reference file includes general reference file metadata 501, reference file media data (modified from original) 502, and internal blockchain 510. The internal blockchain 510 includes a series of blocks 311A (the genesis block associated with the master file 300), 511B (the modified block associated with the first reference file (i.e., a first round of changes to the master file 300)), and 511*x* (a second or later reference block associated with possibly several rounds of changes to the original master file 300). Each block in the chain is further divided as described above into subsections, and the subsections are labeled as according to a numerical series (i.e., 511, 512, 513, 514, 515, 516, 517, 518, 519, and 520). As each round of media data changes take place, the server computer 120 generates a new reference file 500 and associated blockchain data, with each block in the chain maintaining the same relative format. For convenience, numerical references among the reference file blockchain subsections follow the same numerical arrangement (e.g., 511, 512, 513, 514, 515, 516, 517, 518, 519, and 520), with each generation of subsections having an indexed letter suffix (starting at "B") appended thereto. This is schematically shown in FIG. 5 as 511B, 512B, 513B, 514B, 515B, 516B, 517B, 518B, 519B, and 520B and 511*x*, 512*x*, 513*x*, 514*x*, 515*x*, 516*x*, 517*x*, 518*x*, 519*x*, and 520*x*. If more than twenty-six generations of changes occur, (e.g., at the end of a run through the alphabet), an additional suffix letter, starting with A is added (e.g., a second run through the alphabet would begin with BA, BB, and so on). It is noted that suffix letter "A" is reserved for original, master file 300 and used to identify the genesis/origin block generated for the master file.

The blockchain also includes a hashable portion of the block 512*x*, a previous block hash (in the case of block A, the genesis block, this value is null or some other predefined convention) 513*x*, a public key used in digital signature, that may include metadata about the public key 514*x*, and other block metadata 515*x*. Block 516*x* includes a signed, hash of media data and possibly metadata. There are two preferred formats for this information: (a) signed hash of the file metadata (or its root hash) and the file media data (or its hash/root hash), or (b) signed hash of the file metadata and a signed hash of file (or root hash) of the file media data. Other formats for this signed, hashed information may also be selected according to the preferences of one skilled in this art. Block 517*x* is a signed hash (or signed root hash) of block incrementing instructions 519*x*, noting that such instruction and associated hash may only be present as a null value in block A, the genesis block, as no changes from the master file will have occurred. Block 518*x* is a "block extension", and this is information held in reference media files which is not required in (but not restricted from) distributable media files, and it is preferably not included in the block hash. Block 519*x* contains prescriptive, replicable instructions detailing how to get from the version of the media data represented by the previous block to the version of the media data represented by this block (not present in block A because, as noted elsewhere, block A represents the original, master file version of the media that came from the sensor of the capture device 136). Block 520*x* is an optional copy of the media data at this point in the history of the media. Optionally, 311A may include 318A, null block 319A, and 320A, where block 318A is a "block extension", and preferably not included in the block hash, and block 320A is an optional copy of the media data at this point in the history of the media.

Figure 6:
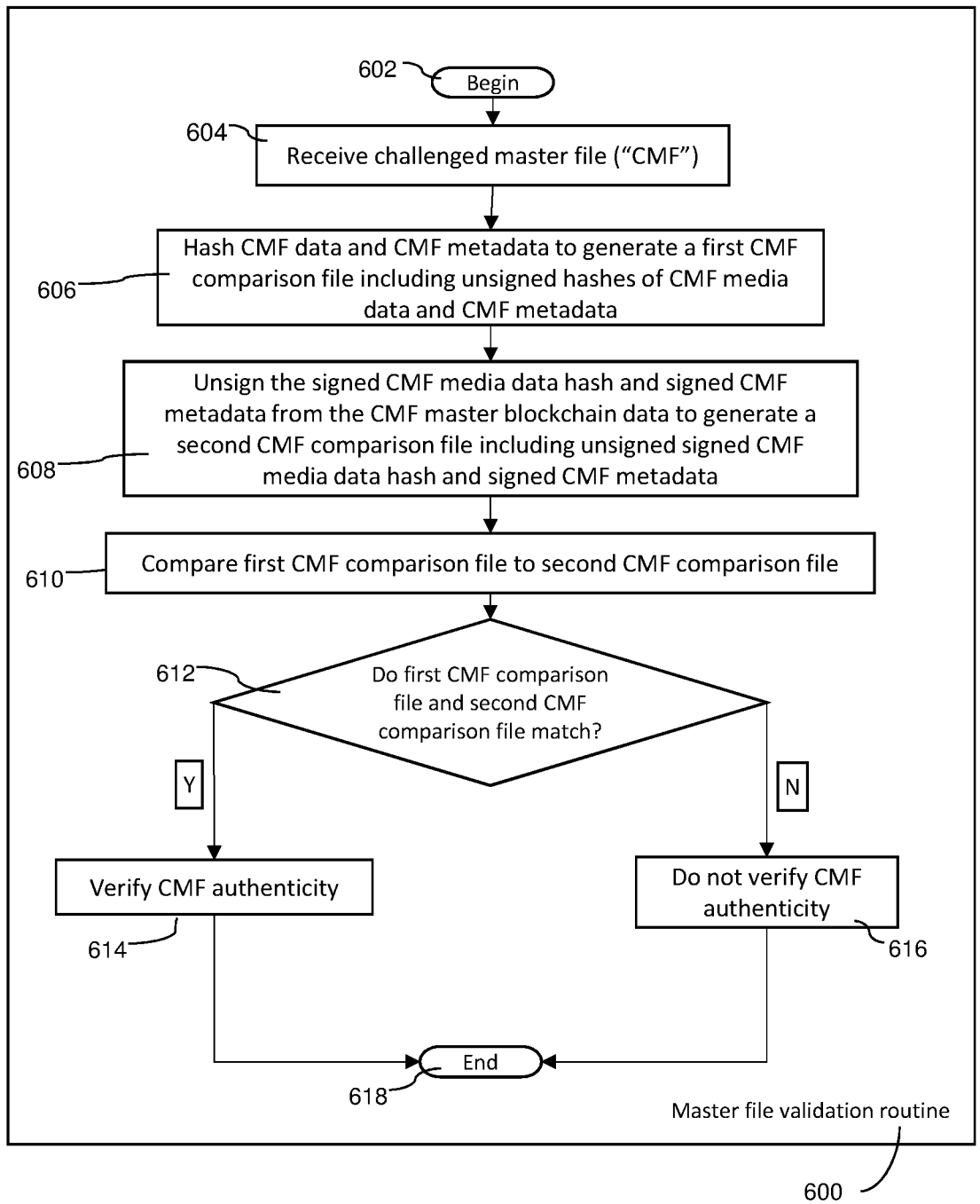
FIG. 6 is a flowchart illustrating a method, implemented using the system shown in FIG. 1, of validating a reference file according to aspects of the invention.

With reference to FIG. 6, a process for validating a master file 300 according to aspects of the present invention will now be described. At block 604, the server computer 120 receives a challenged master file (hereafter, "CMF") which is to be validated. At block 606, the server computer 120 hashes CMF data and CMF metadata to generate a first CMF comparison file including unsigned hashes of CMF media data and CMF metadata. At block 608, the server computer 120 unsigns the signed CMF media data hash and signed CMF metadata from the CMF master blockchain data to generate a second CMF comparison file including unsigned signed CMF media data hash and signed CMF metadata. At block 610, the server computer 120 compares the first CMF comparison file to the second CMF comparison file and determines at block 612 whether those files match. If the first CMF comparison file and second CMF comparison file match, then the server computer deems the CMF at block 614 to be an authentic copy of the master file 300. However, if the first CMF comparison file and second CMF comparison files do not match, the server computer 120 does not confirm the authenticity of the CMF, and the server computer deems the CMF to be inauthentic at block 616.

It is noted that according to aspects of the present invention, an assumption is made that the public key of the origin block is valid (i.e., representing of the sensor device that supplied it), and the capture device 130 that supplied the public key is trusted (this includes that the sensor of the capture device 136 has not been tampered with since the public key was embedded into the master media file). Verifying that sensor of the capture device 136 is trusted may be done in a variety of ways that may or may not involve the application validating the original media file.

Figure 7:
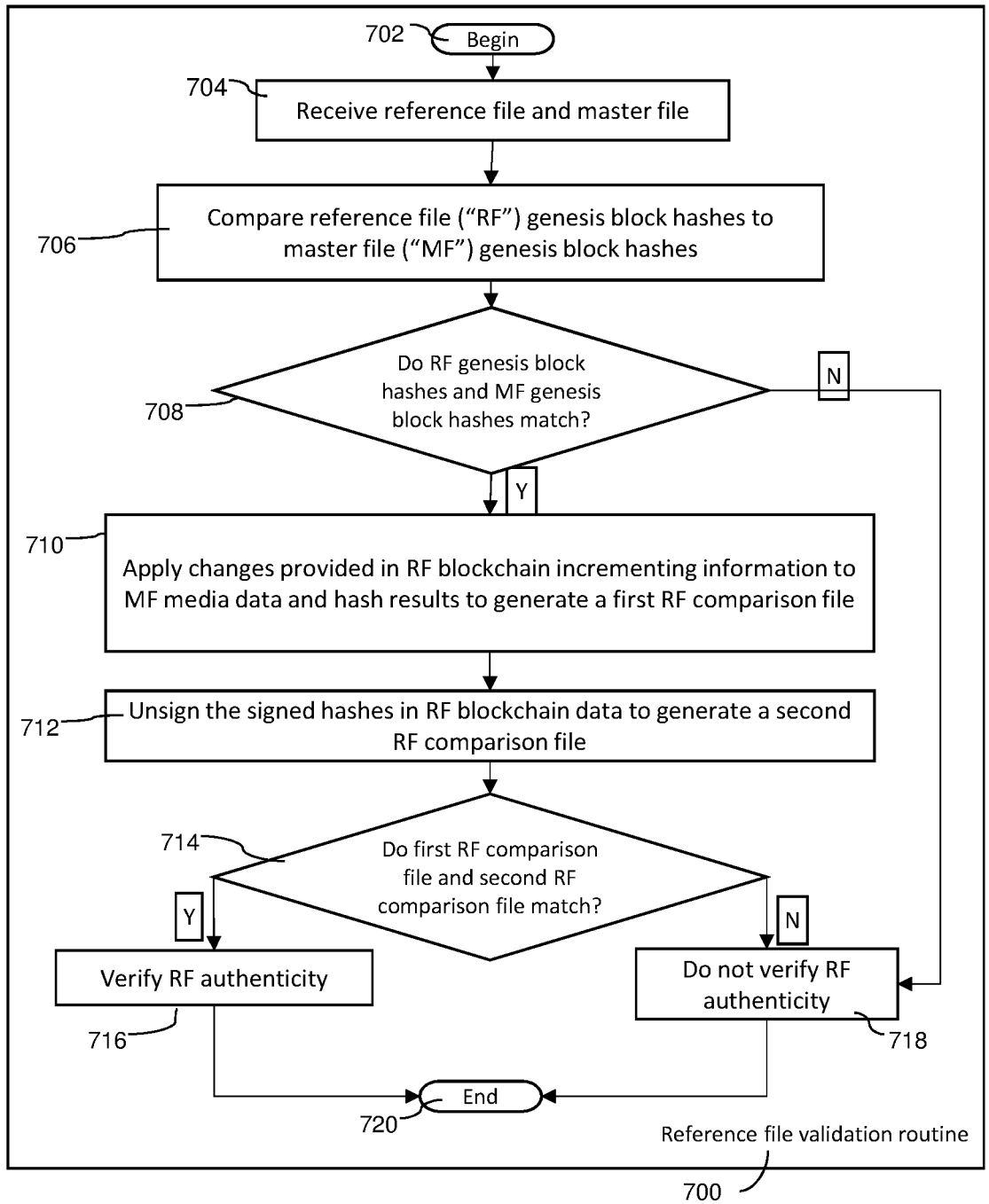
FIG. 7 is a flowchart illustrating a method, implemented using the system shown in FIG. 1, of validating a reference file according to aspects of the invention.

With reference to FIG. 7, a process for validating a reference file 500 according to aspects of the present invention will now be described. At block 704, the server computer 120 receives a reference file 500 which is to be compared with a master file 300 for authentication (e.g., whether the reference file content represents content that has been modified from the master file content in accordance with instructions provided with reference file). At block 706, the server computer 120 compare reference file 500 genesis block hashes to master file 300 genesis block hashes, and at block 708, the server computer determines whether the compared genesis block hashes match. If the compared genesis block hashes do not match, the reference file may not be authentic, and the computer moves to block 718.

If the compared genesis block hashes do match, then the computer moves to block 710 and applies changes provided in reference file blockchain incrementing information to master file media data and hashes the results to generate a first reference file comparison file. At block 712, the server computer 120 unsigns the signed hashes in RF blockchain data to generate a second RF comparison file. At block 714, the server computer 120 determines whether the first reference file comparison file and second reference file comparison file match. If the reference file comparison files match, the server computer 120 moves to block 716 and verifies the authenticity of the reference file 500. If the reference file comparison files do not match, the validity of the reference file is not confirmed, and the computer moves to block 718, in which the computer does not verify the authenticity of the reference file 500, and the reference file may be labeled as inauthentic.

Figure 8:
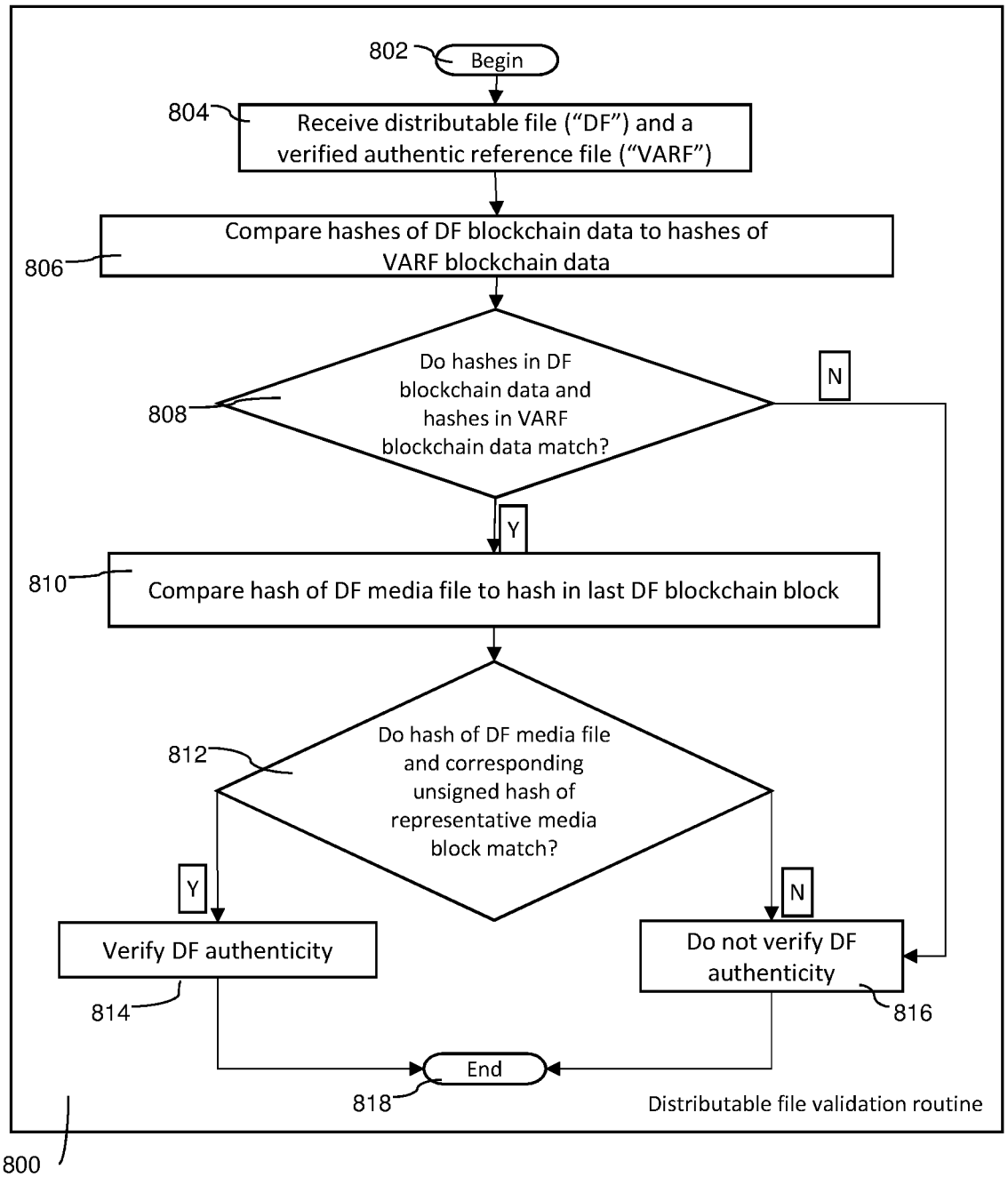
FIG. 8 is a flowchart illustrating a method, implemented using the system shown in FIG. 1, of validating a distributable file according to aspects of the invention.

Now with reference to FIG. 8, a method of validating a distributable file according aspects of this invention will now be described. At block 804, the compute receives a distributable file (hereafter, "DF") and a verified authentic reference file (hereafter, "VARF") to determine whether the DF is a file containing an authentic version of media data contained in the VARF. At block 806, the computer compares hashes of DF blockchain data to hashes of VARF blockchain data, and at block 808 determines whether the compared hashes of blockchain data match. If the compared hashes of blockchain data do not match, the distributable file may not be authentic, and the computer moves to block 816.

If the compared hashes of blockchain data do match, then the computer moves to block 810 and compares, at block 812, the hash of the DF media file to a corresponding unsigned hash of a representative media block. In one embodiment, the corresponding unsigned hash is the unsigned hash 516x in the representative media block x, and the representative media block x is the block that represents the media data in block 502 at the associated iteration in the blockchain history. If the hashes of the DF media file and the hash in last DF blockchain block match, then the DF is deemed to be authentic. At block 814, the computer verifies the authenticity of the DF.

It is noted that the term capture device output as used herein includes sensor data. It is also noted that the term master file as used herein includes a media file following the format shown in FIG. 3 and which is the direct result of a capture device sensor recording reality through the previously described methods.

The term reference file as used herein includes a media file that is not intended for distribution and which uses a file format shown in FIG. 5. This format may include change logs of varying formats or no change logs. A reference media file is distinct from a master media file because it has undergone alterations according to the previously described methods.

The term distributable media file includes a media file that is intended for distribution to end recipients. Distributable media files use a format shown on FIG. 5. It is noted that a distributable media file in which the media data has not undergone any changes (and thus, the blockchain only contains the genesis block) may be seem indistinguishable from a master media file. It is also noted that if metadata about the file is not considered to be essential (and thus its hashes are not included in the blockchain), metadata in a distributable media file may vary from that in an original media file. The term change log includes replicable instructions on how to modify a previous version of media data into the current version of the media data.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
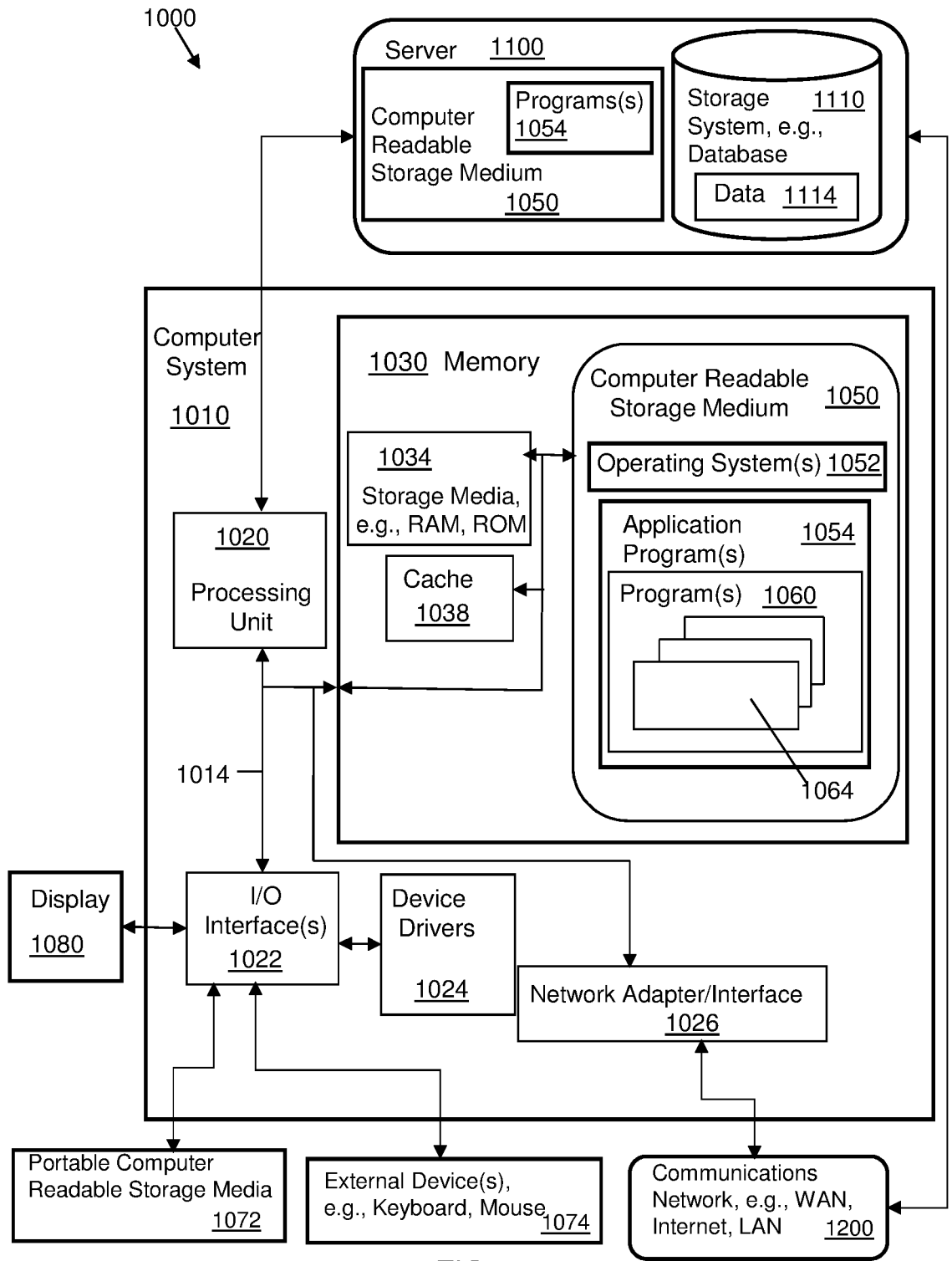
FIG. 9 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 9, a system or computer environment 1000 includes a computer diagram 1010 shown in the form of a generic computing device. The method 100, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer system? 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that the control system 70 (shown in FIG. 8) can include all or part of the computer system 1010 and its components, and/or the control system can communicate with all or part of the computer system 1010 and its components as a remote computer system, to achieve the control system functions described in the present disclosure. It is also understood that the one or more communication devices 110 shown in FIG. 1 similarly can include all or part of the computer system 1010 and its components, and/or the communication devices can communicate with all or part of the computer system 1010 and its components as a remote computer system, to achieve the computer functions described in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
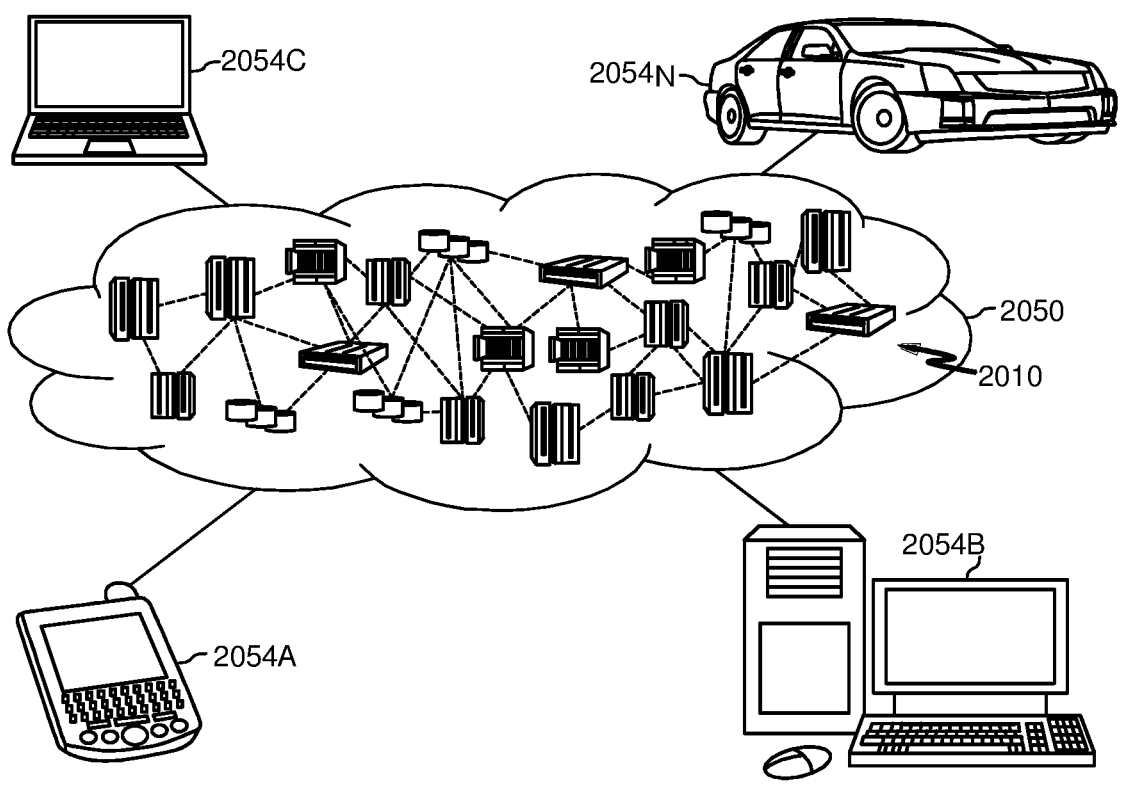
FIG. 10 depicts a cloud computing environment according to an embodiment of the present invention.

Referring now to FIG. 10, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 10 are intended to be illustrative only and that computing nodes 2010 and cloud computing environment 2050 can communicate with any type of computerized device over any type of network and/or network addressable connection (e.g., using a web browser).

Figure 11:
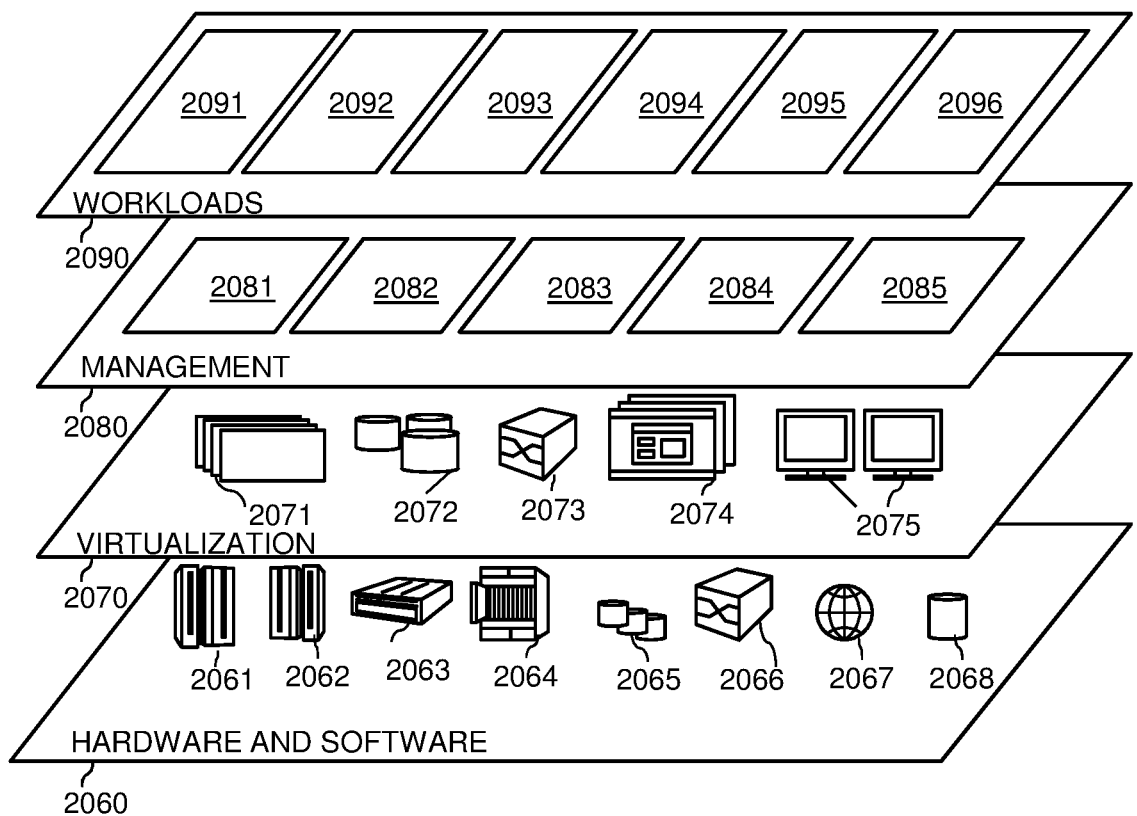
FIG. 11 depicts abstraction model layers according to an embodiment of the present invention.

Referring now to FIG. 11, a set of functional abstraction layers provided by cloud computing environment 2050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and storing and verifying changes made to as-captured sensor device media data 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    identifying, by a computer, a capture device output, said output representing an aspect of a recorded event;
    cryptographically processing, by said computer, said capture device output to produce a validatable master file;
    wherein said validatable master file includes master media data from said capture device output, master metadata of said master media data, and master file blockchain data; and
    wherein said master file blockchain data includes a master file block history portion, a master file signature key portion, a master file change indication portion, and a master file signed data hash portion.

2. The computer-implemented method of claim 1, wherein said cryptographically processing comprises:
    dividing said media data, by said computer, into at least one data subset;
    generating, by said computer, a hash of said at least one data subset;
    generating, by said computer, metadata of said hash of said at least one data subset;
    combining, by said computer, said hash and said metadata of said hash into at least one data packet; and
    cryptographically signing, by said computer, said at least one data packet.

3. The computer-implemented method of claim 1, further including:
    modifying, by said computer, said master media data to produce reference file media data; and
    preparing, by said computer, a reference file including said reference file media data, reference file metadata, and reference file blockchain data;
    wherein said reference file blockchain data includes said master file blockchain data and blockchain incrementing information, wherein said blockchain incrementing information includes a hash of said master file blockchain data, reference file blockchain metadata, and a reference file signed data hash portion.

4. The computer-implemented method of claim 3, wherein said reference file further includes instructions indicating replicable changes made, by said computer, between said modified media and said media data of said master file.

5. The computer-implemented method of claim 1, further including:
    receiving, by said computer, a challenged master file identified as a copy of said validatable master file;
    receiving, by said computer, a request to validate said challenged master file; and executing, by said computer, a master file validation routine to assess validity of said challenged master file;
    wherein said master file validation routine includes
        hashing, by said computer, media data of said challenged master file to generate hashed challenged master file media data;
        unsigning, by said computer, a signed media data hash portion of said challenged master file to generate unsigned challenged master file media data; and
        determining, by said computer, whether said hashed challenged master file media data and said unsigned challenged master file media data match.

6. The computer-implemented method of claim 3, further comprising:
    receiving, by said computer, a reference file identified as a modified version of said master file;
    receiving, by said computer, a request to determine whether said reference file is a modified version of said master file; and
    executing, by said computer, a reference file verification routine; wherein said reference file verification routine includes
        determining, by said computer, whether said hash of said master file blockchain data and a hash of blockchain data of said reference file match; and
        applying, by said computer, changes indicated by said blockchain incrementing information to media data in said reference file to generate hashed reference file media data and unsigning a reference file blockchain data to generate unsigned reference file blockchain media data; and
        determining, by said computer, whether said hashed reference file media data and said unsigned reference file blockchain media data match.

7. The computer-implemented method of claim 6, further comprising:
receiving, by said computer, a reference file identified as an authentic modification of said master file;
receiving, by said computer, a distributable file;
receiving, by said computer, a request to determine whether said distributable file is an authentic modification of said reference file identified as an authentic modification of said master file; and
executing, by said computer, a distributable file verification routine;
wherein said distributable file verification routine includes determining whether a hash of distributable file blockchain data matches a hash of said reference file blockchain data and whether a hash of distributable file media data matches a corresponding unsigned hash of a representative media block.

8. A system which comprises:
a computer system comprising a computer readable storage medium having program instructions embodied therewith, the program instructions executable by a computer to cause the computer to:
identify a capture device output, said output representing an aspect of a recorded event; cryptographically process said capture device output to produce a validatable master file; wherein said validatable master file includes master media data from said capture device output, master metadata of said master media data, and master file blockchain data; and
wherein said master file blockchain data includes a master file block history portion, a master file signature key portion, a master file change indication portion, and a master file signed data hash portion.

9. The system of claim 8, wherein said cryptographically processing includes further causing said computer to:
divide said media data into at least one data subset;
generate a hash of said at least one data subset;
generate metadata of said hash of said at least one data subset;
combine said hash and said metadata of said hash into at least one data packet;
and cryptographically sign said at least one data packet.

10. The system of claim 8, further causing said computer to:
modify said master media data to produce reference file media data;
prepare a reference file including said reference file media data, reference file metadata, and reference file blockchain data; and
wherein said reference file blockchain data includes said master file blockchain data and blockchain incrementing information,
wherein said blockchain incrementing information includes
a hash of said master file blockchain data, reference file blockchain metadata, and a reference file signed data hash portion.

11. The system of claim 10, wherein said reference file further includes instructions indicating replicable changes made, by said computer, between said modified media and said media data of said master file.

12. The system of claim 8, further causing said computer to:
receive a challenged master file identified as a copy of said validatable master file; receive a request to validate said challenged master file; and
execute a master file validation routine to assess validity of said challenged master file; wherein said master file validation routine further causes said computer hash media data of said challenged master file to generate hashed challenged master file media data;
unsign a signed media data hash portion of said challenged master file to generate unsigned challenged master file media data; and
determine whether said hashed challenged master file media data and said unsigned challenged master file media data match.

13. The system of claim 10, further comprising:
receiving, by said computer, a reference file identified as a modified version of said master file;
receiving, by said computer, a request to determine whether said reference file is a modified version of said master file; and
executing, by said computer, a reference file verification routine;
wherein said reference file verification routine includes
determining, by said computer, whether said hash of said master file blockchain data and a hash of blockchain data of said reference file match; and
applying, by said computer, changes indicated by said blockchain incrementing information to media data in said reference file to generate hashed reference file media data and unsigning a reference file blockchain data to generate unsigned reference file blockchain media data; and
determining, by said computer, whether said hashed reference file media data and said unsigned reference file blockchain media data match.

14. The system of claim 13, further comprising:
receiving, by said computer, a reference file identified as an authentic modification of said master file;
receiving, by said computer, a distributable file;
receiving, by said computer, a request to determine whether said distributable file is an authentic modification of said reference file identified as an authentic modification of said master file; and
executing, by said computer, a distributable file verification routine;
wherein said distributable file verification routine includes determining whether a hash of distributable file blockchain data matches a hash of said reference file blockchain data and whether a hash of distributable file media data matches a corresponding unsigned hash of a representative media block.

15. A computer program product comprising a computer readable storage medium having program instructions embodied therewith, the program instructions executable by a computer to cause the computer to:
identify a capture device output, said output representing an aspect of a recorded event; cryptographically process said capture device output to produce a validatable master file; wherein said validatable master file includes master media data from said capture device output, master metadata of said master media data, and master file blockchain data; and wherein said master file blockchain data includes a master file block history portion, a master file signature key portion, a master file change indication portion, and a master file signed data hash portion.

16. The computer program product of claim 15, wherein said cryptographically processing includes further causing said computer to:
- divide said media data into at least one data subset;
- generate a hash of said at least one data subset;
- generate metadata of said hash of said at least one data subset;
- combine said hash and said metadata of said hash into at least one data packet; and cryptographically sign said at least one data packet.

17. The computer program product of claim 15, further causing said computer to:
- modify said master media data to produce reference file media data;
- prepare a reference file including said reference file media data, reference file metadata, and reference file blockchain data; and
- wherein said reference file blockchain data includes said master file blockchain data and blockchain incrementing information,
- wherein said blockchain incrementing information includes
- a hash of said master file blockchain data, reference file blockchain metadata, and a reference file signed data hash portion.

18. The computer program product of claim 15, further causing said computer to:
- receive a challenged master file identified as a copy of said validatable master file; receive a request to validate said challenged master file; and
- execute a master file validation routine to assess validity of said challenged master file; wherein said master file validation routine further causes said computer
- hash media data of said challenged master file to generate hashed challenged master file media data;
- unsign a signed media data hash portion of said challenged master file to generate unsigned challenged master file media data; and
- determine whether said hashed challenged master file media data and said unsigned challenged master file media data match.

19. The computer program product of claim 17, further comprising:
- receiving, by said computer, a reference file identified as a modified version of said master file;
- receiving, by said computer, a request to determine whether said reference file is a modified version of said master file; and
- executing, by said computer, a reference file verification routine; wherein said reference file verification routine includes
- determining, by said computer, whether said hash of said master file blockchain data and a hash of blockchain data of said reference file match; and
- applying, by said computer, changes indicated by said blockchain incrementing information to media data in said reference file to generate hashed reference file media data and unsigning a reference file blockchain data to generate unsigned reference file blockchain media data; and
- determining, by said computer, whether said hashed reference file media data and said unsigned reference file blockchain media data match.

20. The computer program product of claim 19, further comprising:
- receiving, by said computer, a reference file identified as an authentic modification of said master file;
- receiving, by said computer, a distributable file;
- receiving, by said computer, a request to determine whether said distributable file is an authentic modification of said reference file identified as an authentic modification of said master file; and
- executing, by said computer, a distributable file verification routine;
- wherein said distributable file verification routine includes determining whether a hash of distributable file blockchain data matches a hash of said reference file blockchain data and whether a hash of distributable file media data matches a corresponding unsigned hash of a representative media block.

* * * * *